3,030,414
PROCESS OF PREPARING META- AND PARA-NITROBENZOIC ACIDS

Robert S. Barker, Port Washington, and Alfred Saffer, Bayside, N.Y., assignors to Mid-Century Corporation, Chicago, Ill., a corporation of Delaware
No Drawing. Filed May 5, 1958, Ser. No. 732,797
10 Claims. (Cl. 260—524)

This invention relates to a process for the catalytic oxidation of organic compounds. More particularly it pertains to a process for the preparation of meta- and para-nitrobenzoic acid by the liquid phase oxidation of the corresponding nitro-substituted mono-alkylbenzenes using molecular oxygen as the oxidizing means and especially to a liquid phase oxidation process catalyzed by the conjoint presence of a heavy metal oxidation catalyst and bromine.

In our copending application Serial No. 530,401, filed August 24, 1955, now U.S. Patent 2,833,816, of which the present application is a continuation in part there is disclosed a novel process for the catalytic oxidation by means of molecular oxygen of aromatic organic compounds containing at least one, and preferably as claimed therein, a plurality of oxidizable aliphatic substituents, to produce aromatic carboxylic acids. In accordance with the process disclosed in said application, aromatic compounds having aliphatic substituents are treated with molecular oxygen in the liquid phase in the presence of a catalyst comprising in conjoint presence bromine and a metal oxidation catalyst to effectively and selective oxidize the aliphatic substituents to carboxylic acid groups. Among the aliphatic substituted aromatic feedstocks suitable for use in the process and broadly contemplated by the claims of the aforesaid application are aromatic compounds containing non-oxidizable nuclear substituents which are otherwise inert under the reaction conditions employed.

In the present application we are claiming specifically the process based on our finding that liquid phase oxidation with molecular oxygen in the presence of catalytic amounts of bromine and of heavy metal oxidation catalysts is surprisingly effective for the conversion of alkyl mononitrobenzenes selected from the group consisting of meta-nitro-alkyl-benzenes and para-nitro-alkylbenzenes to the corresponding nitrobenzoic acids. Our process is of special valve for the economical production of meta-nitrobenzoic acid and para-nitrobenzoic acid from the corresponding nitrotoluenes, which comprise a preferred class of feedstocks for the present process.

In the practice of the invention, the oxidation of organic compounds whereby mono-nitrobenzoic acids are obtained is effected by reacting a member of the group consisting of meta and para-nitro-monoalkyl-benzenes, especially meta and para-nitrotoluene with molecular oxygen, e.g. air, in the conjoint presence of bromine and a heavy metal oxidation catalyst. As the heavy metal oxidation catalyst there may be employed catalysts that have heretofore been employed for accelerating the oxidation of organic compounds, such as the solid polyvalent metals having atomic weights between about 50 and 200. Of the heavy metal group, those metals having an atomic number not greater than 84 have been found most suitable. Excellent results are obtained by utilization of a metal having an atomic number 23–28, including vanadium, chromium, manganese, iron, cobalt and nickel. Particularly excellent results are obtained with a metal of the group consisting of manganese, cobalt and mixtures thereof.

It has been found that the catalytic amount of the metal may be either as a single metal or as a combination of such metals. The metal may be added in elemental, combined or ionic form and the bromine may similarly be added in elemental, combined or ionic form. As a source of bromine, ammonium bromide or other bromine compounds soluble in the reaction medium may be employed. Satisfactory results have been obtained for example, with potassium bromide, tetrabromoethane and benzyl bromide.

The metal may be supplied in the form of the free metal, as the oxide or hydroxide, or in the form of metal salts. For example, the metal manganese may be supplied as the manganese salt of a lower aliphatic carboxylic acid, such as manganese acetate, as the salt of a fatty acid such as manganese oleate or linoleate, as the metal salt of an aromatic or alicyclic acid, such as manganese naphthenate, or in the form of an organic complex, of which mention may be made of the acetylacetonate, the 8-hydroxy-quinolinate and the ethylene diamine tetra-acetate, etc., as well as manganese salts such as the borates, halides, nitrates and the like which are also efficacious.

The reaction temperature should be sufficiently high so that the desired oxidation reaction occurs, and yet not so high as to cause undesirable charring or formation of tars. Thus temperatures in the range of about 120° to about 275° C., desirably 150° to 250° C. and preferably 170° to 225° C. may be employed. The reaction time should be sufficient to obtain a desirable conversion of the substituted aromatic material to the desired nitro-substituted carboxylic acid, e.g. in the range of about 0.5 to about 25 or more hours, preferably up to about 4 hours.

The oxygen used may be in the form of substantially 100% oxygen gas or in the form of gaseous mixtures containing lower concentrations of oxygen, such as for example, air. The ratio of total oxygen fed into the reaction mixture relative to the aromatic compound oxidized is to the range of about 2 to 500 moles of oxygen per mole of substituted aromatic material, desirably in the range of 5 to 300 and preferably in the range of 5 to 75.

The process of the present invention is conducted under essentially liquid phase conditions, desirably in the presence of an oxidation resistant reaction medium in which the organic reactant is soluble or suspended. The relation of temperature and pressure is so regulated as to provide a liquid phase in the reaction zone. Generally, the pressure may be in the range of atmospheric to about 1500 p.s.i.g., the pressure being sufficient at the operating temperature to maintain all or a part of the organic reactant in the liquid phase.

As inert reaction media there may be employed materials substantially inert to oxidation which facilitate carrying out the desired reaction and recovering the desired product or products. Desirably this added medium is a monocarboxylic acid relatively stable or inert to oxidation in the reaction system, preferably containing about 2 to 8 carbon atoms in the molecule, for example, saturated aliphatic monocarboxylic acids, aromatic acids such such as benzoic acid, alicyclic acids such as cyclohexane carboxylic acid and the like. Saturated aliphatic monocaroboxylic acids containing 2 to 4 carbon atoms are particularly preferred. Mixtures of acids may be used, for example mixtures of said lower saturated carboxylic acids or mixtures of such acids with benzoic acid. Where all of the advantages of an acid medium are not required, other inert media may be used, of which mention may be made of benzene, carbon tetrachloride, chlorinated hydrocarbons such as chlorinated benzenes or chlorinated naphthalenes, and the like.

Where the lower aliphatic monocarboxylic acid medium is used, it is generally not necessary to use large amounts thereof. Such acids in the range of 0.1 to 10 parts by weight, desirably 0.5 to 4 and preferably 1 to 2.5 per part of aromatic material have been found adequate.

The catalyst, illustratively may be a heavy metal bromide, for example, manganese bromide, and may be added as such or by means of materials which provide a catalytic amount of heavy metal and of bromine in the reaction system. The heavy metal oxidation catalyst may be added in the form of the metal, oxide, acetate or analogous carboxylate salts or as a heavy metal halide; and the bromine may, as above indicated, be added in the form of elemental bromine, ammonium bromide, hydrogen bromide or other bromine compounds soluble or partially soluble in the system, e.g. potassium bromate. If desired, the bromine may be in the form of a soluble organic bromide viz. tetrabromoethane, benzyl bromide, and the like. The amount of catalyst, for example of manganese and bromine, calculated as $MnBr_2$ may be in the range of about 0.1 to 10 percent by weight or more of the aromatic reactant charged, desirably 0.3 to 2 and preferably 0.5 to 1.7 percent. Mixtures of materials may be used, and the proportions of heavy metal oxidation catalyst and bromine may be varied from their stoichiometric proportions encountered in heavy metal bromides such as $MnBr_2$, for example in the range of about 1 to 10 atoms of heavy metal per atom of bromine to about 1 to 10 atoms of bromine per atom of heavy metal.

In order to facilitate a clear understanding of the invention, the following preferred specific embodiments are described in detail.

*Example 1*

In a tubular reactor fitted with a stirrer and heating means and provided with a water cooled condenser, gas inlet means and valved gas outlet for adjusting the exit flow of gas was charged 50.0 g. of p-nitrotoluene, 150 g. of glacial acetic acid, 0.6 g. of a mixture of cobalt acetate and manganese acetate (as the tetrahydrates) and 1.0 g. of ammonium bromide. The reactor was heated to 204° C. and pressured to 400 p.s.i.g. with air. Air was then introduced through a sparger beneath the liquid surface at a rate of 3.4 liters per minute the temperature and pressure being maintained at 204° C., 400 p.s.i.g. respectively. Oxidation was continued for 70 minutes, at the end of which time the oxygen content of the vent gases was 20.8%. The reactor contents were cooled to 25° C., filtered and the collected solids washed with 20 ml. of glacial acetic acid. The dry cake weighed 52 g. (86% yield) and had a melting point of 237–238° C. and neutral equivalent of 168.2. Pure para-nitrobenzoic acid melts at 240° C. and has a neutral equivalent of 167.

In order to show the necessity for the added bromine-containing compound, a second run was conducted using the same reactants and reaction conditions as above, except that no ammonium bromide was employed. At 204° F., oxygen absorption as indicated by analysis of the vent gases, stopped after 18 minutes. The temperature was raised to 221° C. (no oxygen absorption), then to 245° C. (no oxygen absorption) and finally to 263° C. Slight oxygen uptake ensued over a period of about 50 minutes at this temperature. The reactor contents were then cooled to 25° C. and filtered, giving 16.4 g. of impure para-nitrobenzoic acid (27% yield) having a melting point of 230–234° C. From the filtrate were recovered 23 g. of unreacted para-nitrotoluene.

*Example 2*

Following the procedure of Example 1, a mixture of 50 g. of metanitrotoluene, 150 g. of glacial acetic acid, 0.6 g. of a mixture of manganese acetate and cobalt acetate (as the tetrahydrates) and 1.0 g. of ammonium bromide was treated with air at 204°–208° C. and 400 p.s.i.g. Oxidation was complete after 83 minutes, as evidenced by analysis of the vent gases. The reactor contents were evaporated to dryness on a steam bath, the residue (63.5 g.) dissolved in 300 ml. hot benzene, cooled to room temperature and filtered. There was obtained 59.2 g. or an essentially quantitative yield of meta-nitrobenzoic acid melting at 137–141° C. After recrystallization from water, the product melted at 140–141° C. and had a neutral equivalent of 169.1.

In the absence of ammonium bromide, otherwise using the same reactants and conditions as above, the oxidation of meta-nitrotoluene was much slower, requiring 127 minutes until oxygen absorption ceased, and gave only 80% of meta-nitrobenzoic acid.

The process of the present invention can be conducted on a continuous, intermittent or batch basis. Water may be removed to maintain any desired concentration thereof, e.g. by distillation, by adding acetic anhydride or the like.

Desirable or comparable results may be achieved with various modification of the process described and exemplified above. Thus, the pressure may be varied in the range of atmospheric up to about 1500 p.s.i.g., the pressure being sufficient to maintain all or a part of the organic reactant in the liquid phase. It will be recognized that time, temperature, catalyst concentration and the like are interrelated variables, and may be varied depending upon the particular feedstock being oxidized. Lower temperatures may, for example, be indicated where a more highly concentrated source of molecular oxygen is employed in lieu of air, for example pure oxygen or mixtures of oxygen and inert gas containing 50% or more by volume of molecular oxygen.

The alkyl substituent on the aromatic nucleus which is converted to a carboxylic group may comprise an oxidizable alkyl group of 1 to 8 carbon atoms, preferably 1 to 4 carbon atoms. Such substituents may include, for example, methyl, ethyl, isopropyl, butyl, and the like. Tertiary alkyl group, for example the tertiary butyl group, which are attached to the aromatic nucleus at the site of the tertiary carbon atom, are more difficult to oxidize and may require more elevated temperature and/or higher catalyst concentrations to effect conversion of the carboxyl group. Meta and para-mono-nitrotoluene comprise preferred feedstocks for the present process.

The meta and para-nitrobenzoic acids which are produced by the process of the present invention are useful chemical compounds and valuable intermediates for the preparation of plasticizers, pharmaceuticals, dyes and the like. They may be reduced to the corresponding meta and para-aminobenzoic acid, the latter being particularly valuable in the form of various N-substituted esters as local anesthetics.

In view of the foregoing disclosures, variations and modifications of the invention will be apparent to those skilled in the art, and it is intended to include within the invention all such variations and modifications except as do not come within the scope of the appended claims.

We claim:

1. A process for preparing a compound selected from the group consisting of meta and para-nitrobenzoic acid which comprises reacting in a reaction zone, while maintaining a liquid phase in said zone, an aromatic compound selected from the group consisting of metal-nitro-toluene and para-nitro-toluene with molecular oxygen in the presence of a catalyst consisting essentially of bromine and a heavy metal oxidation catalyst in an amount between about 0.3% and about 2% by weight based on the weight of said nitrotoluene compound, effecting said reaction at a temperature between about 150° C. and about 250° C. and a pressure between 0 and about 1500 p.s.i.g., and recovering said nitro-benzoic acid.

2. A process as defined in claim 1 wherein the heavy metal has an atomic number of 23 to 28 inclusive.

3. A process as defined in claim 1 wherein the bromine is present in a ratio of about 0.1 to about 10.0 atoms per atom of heavy metal oxidation catalyst.

4. A process as defined in claim 1 carried out in the presence of a monocarboxylic acid having from 2 to 8 carbon atoms in the molecule.

5. A process for preparing para-nitrobenzoic acid which comprises reacting a para-nitro-toluene in the liquid phase in a solvent comprising a saturated lower aliphatic monocarboxylic acid having from 2 to 4 carbon atoms in the molecule with molecular oxygen in the presence of a catalyst consisting essentially of bromine and a heavy metal oxidation catalyst, effecting said reaction at a temperature between about 150° C. and about 250° C. and a pressure between 0 and about 1500 p.s.i.g., and recovering said para-nitrobenzoic acid.

6. The process of claim 5 wherein said heavy metal oxidation catalyst is selected from the group consisting of manganese, cobalt and mixtures thereof.

7. The process of claim 6 wherein acetic acid is employed as the solvent.

8. A process for preparing meta-nitrobenzoic acid which comprises reacting a meta-nitro-toluene in the liquid phase in a solvent comprising a saturated lower aliphatic monocarboxylic acid having from 2 to 4 carbon atoms in the molecule with molecular oxygen in the presence of a catalyst consisting essentially of bromine and a heavy metal oxidation catalyst, effecting said reaction at a temperature between about 150° C. and about 250° C. and a pressure between 0 and about 1500 p.s.i.g., and recovering said meta-nitrobenzoic acid.

9. The process of claim 8 wherein said heavy metal oxidation catalyst is selected from the group consisting of manganese, cobalt and mixtures thereof.

10. The process of claim 9 wherein acetic acid is employed as the solvent.

References Cited in the file of this patent

UNITED STATES PATENTS

| | | |
|---|---|---|
| 2,245,528 | Loder | June 10, 1941 |
| 2,673,217 | Hull | Mar. 23, 1954 |
| 2,815,373 | Mayurnik | Dec. 3, 1957 |
| 2,833,816 | Saffer et al. | May 6, 1958 |